United States Patent Office 2,928,884
Patented Mar. 15, 1960

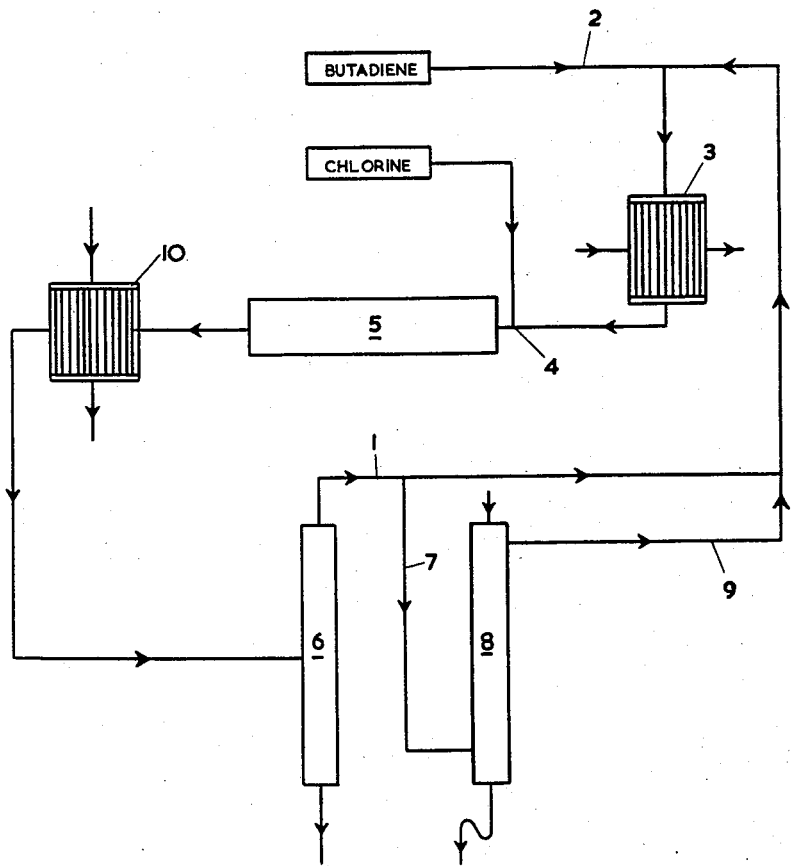
INVENTORS.
FREDERICK JAMES BELLRINGER.
HENRY PETER CROCKER.
BY
*Ward heel Haselton Orme & McChannon*
ATTORNEYS.

2,928,884

CHLORINATION OF BUTADIENE

Frederick James Bellringer, Leatherhead, and Henry Peter Crocker, Lower Kingswood, England, assignors to The Distillers Company Limited, Edinburgh, Scotland Application March 6, 1957, Serial No. 644,300

Claims priority, application Great Britain March 22, 1956

12 Claims. (Cl. 260—654)

The present invention relates to the preparation of dichlorbutenes and in particular to an improved process for preparing dichlorbutenes by the vapor phase chlorination of butadiene.

The additive chlorination of butadiene at elevated temperatures in the vapor phase to produce dichlorbutenes is well known. Hitherto, the primary difficulty in obtaining good yields of the desired products has been in controlling the reaction conditions to minimize the formation of by-products. In particular, it has been difficult to avoid the formation of some saturated tetrachlorinated derivatives together with chlorinated butadienes and hydrogen chloride formed by substitutive chlorination of the butadiene. Under the most unfavorable conditions the concentration of hydrogen chloride in the gaseous product can approach 5%, indicating a substantial decrease in yield of the desired dichlorbutenes. Furthermore, as discussed below, hitherto it has been thought necessary to free butadiene from hydrogen chloride prior to chlorination. It has been found in accordance with the present invention that butadiene containing small to large amounts of hydrogen chloride may be employed with improved results in the production of dichlorbutenes.

It is an object of the present invention to provide an improved process for the additive chlorination of butadiene in the vapor phase by means of which the formation of undesired by-products is reduced.

According to the present invention, the process for the production of dichlorbutenes by the additive chlorination of butadiene in the vapor phase comprises contacting chlorine with butadiene in the ratio of at least one mole of butadiene per mole of chlorine at an elevated temperature and adding hydrogen chloride to the reaction mixture.

The amount of hydrogen chloride added to the reaction mixture may vary widely. Advantageously, sufficient hydrogen chloride is added to give a concentration of hydrogen chloride in the reaction mixture of at least 5%, and preferably between 30 and 50% by volume. The hydrogen chloride may be fed to the reaction mixture separately, in admixture with the chlorine feed, or preferably in admixture with the butadiene feed.

The proportion of butadiene to chlorine used in the process of the present invention is at least one mole of butadiene per mole of chlorine. A higher proportion of butadiene than this may be used. If large excesses of butadiene are used, it may be necessary to recover or recycle the unreacted butadiene in order to make the process of the invention commercially economical. The large excess of butadiene also may be advantageous in operation of the process in that it absorbs heat from the reaction, thus making unnecessary some or all of the means used for controlling the temperature of the reaction zone. A similar effect is also obtained by the use of the higher concentrations of hydrogen chloride in the reaction mixture and by the use of other inert diluents in place of some or all of the excess butadiene.

A moderately wide range of temperatures, for instance between about 150° and 450° C., may be used for the reaction, which is preferably carried out continuously. The optimum temperature is dependent on a number of other factors such as contact time, catalysts, the nature of the reaction zone, and the like. Thus when using reaction zones consisting of columns packed with carbon chips, the reaction temperature is desirably maintained below about 300° C., since under these conditions above this temperature the chlorination takes place predominantly by substitution. Preferably, the reaction is carried out in unpacked columns, with the reaction temperature controlled to between 280° and 400° C., for a contact time of not more than 12 seconds, for instance, as described in the copending Capp, Crocker and Bellringer application, Serial No. 644,299, filed March 6, 1957, now Patent No. 2,912,471, dated November 10, 1959. Preferably the butadiene is preheated to a temperature near the reaction temperature before introducing it to the reaction zone, for instance to between 150° and 300° C.

The process of the invention may be carried out at atmospheric, subatmospheric or superatmospheric pressures. Preferably the process is carried out at substantially atmospheric pressure.

The products of the reaction may be recovered in any suitable manner, for instance by fractional distillation, condensation or extraction methods.

In a preferred embodiment of the invention, the resulting reaction product is fractionated to recover a fraction containing the butadiene and hydrogen chloride and this fraction is recycled to the reactor. Hitherto, it has been thought necessary to take careful steps to remove any small amounts of hydrogen chloride formed by substitutive chlorination before recycling the butadiene, particularly as it is known that hydrogen chloride reacts additively with butadiene at low temperatures. The removal of hydrogen chloride has been carried out, for instance by washing the butadiene fraction with water. Since the presence of water in the feed results in corrosion of the reaction equipment and loss of chlorine by conversion to hydrogen chloride it has then been necessary to dry the butadiene very carefully before returning it to the chlorination step. As the butadiene may be present in a very large excess over the chlorine, the removal of hydrogen chloride in this way has necessitated the use of large and expensive extraction and drying equipment. It has now been discovered in accordance with the present invention that it is unnecessary to remove all the hydrogen chloride before recycling the butadiene stream, but that up to 50% by volume may be advantageously retained. When more than the desired level of hydrogen chloride builds up it may be bled off continuously with part of the mixture accompanying it. This small bled portion can be handled in small inexpensive extraction and drying equipment. It is thus a preferred feature of the invention to allow the hydrogen chloride formed in the chlorination reaction by the small proportion of substitution chlorination which takes place, to build up to the desired proportion, as discussed above, by recycling it in the butadiene stream.

The fractionation of the reaction product to recover the unreacted butadiene and hydrogen chloride for recycling may be carried out in a number of ways, for instance by cooling the reaction product and introducing it into a fractionating column from which the butadiene and hydrogen chloride are taken off overhead; the base product is fractionated in a second column to recover the desired dichlorobutenes.

Where the excess butadiene containing small amounts of hydrogen chloride is continuously recycled to the chlorination reactor as described above, the level of hydrogen chloride in the system will gradually build up due to the continued formation of small amounts of hydrogen chloride by substitution chlorination. When the hydrogen chloride level has reached the desired value, namely at least 5% and preferably between 30 and 50% by volume, it will be necessary to bleed off a small part of the recycle butadiene stream and recover the hydrogen chloride from this, for instance by scrubbing with water, by fractional distillation or by fractional condensation of the mixed gases to separate off liquid butadiene, to maintain the desired level of hydrogen chloride in the system. It will be appreciated that it is not necessary to achieve a complete separation in this instance, as long as an amount of hydrogen chloride equal to that being formed is removed from the system to maintain the level constant. Furthermore, the separation of some or all of the hydrogen chloride from a butadiene/hydrogen chloride gas mixture containing, for instance, 30% by volume of hydrogen chloride is a comparatively simple operation compared with the removal of the fractional percentage of hydrogen chloride from the whole of the recycle stream of butadiene as has been carried out hitherto.

In the following examples, which illustrate the process of the invention, parts by weight shown therein bear the same relationship to parts by volume as do kilograms to litres.

Example 1

The reactor used was a metal tube, the reactor volume of which was 50 parts by volume, immersed in a liquid bath of molten sodium nitrile-potassium nitrate. Butadiene and hydrogen chloride were mixed and introduced through a preheating coil into the bottom of the tube, being preheated to 340° C., and chlorine was introduced into the butadiene stream at the bottom, via a jet which ensured highly efficient mixing of the reactants. The reactor products were passed into a fractionating column, at the head of which butadiene and hydrogen chloride were removed and at the kettle of which butadiene chlorination products were removed.

Butadiene at the rate of 175,400 parts by volume per hour, hydrogen chloride at the rate of 112,400 parts by volume per hour and chlorine at the rate of 61,500 parts by volume per hour were fed at a reactor temperature of 400–425° C., these volumes being calculated at normal temperature and pressure. The hydrogen chloride concentration was about 32% by volume. The time of contact was 0.52 second. The products were fractionated and the fractions analyzed by infra-red and gas chromatographic methods. The composition of the product by weight was

| | Percent |
|---|---|
| Dichlorbutenes (3:4-dichlorbutene-1+1:4-dichlorbutene-2) | 84.9 |
| Chloroprene | } 6.5 |
| 1-chlorbutadiene | } |
| High boilers | 8.6 |

Example 2

The reactor used was similar to that used in Example 1.

Butadiene at the rate of 162,000 parts by volume per hour, hydrogen chloride at the rate of 112,000 parts by volume per hour and chlorine at the rate of 61,600 parts by volume per hour were fed at a preheater temperature of 285° C. to give a reactor temperature of 340–353° C., these volumes being calculated at normal temperature and pressure. The hydrogen chloride concentration was about 33% by volume. The time of contact was 0.54 seconds. The products were fractionated and the fractions analyzed by infra-red and gas chromatographic methods. The composition of the product by weight was

| | Percent |
|---|---|
| Dichlorbutenes (3:4-dichlorbutene-1+1:4-dichlorbutene-2) | 87.8 |
| Chloroprene | } 3.3 |
| 1-chlorbutadiene | } |
| High boilers | 8.9 |

Example 3

Recycle butadiene containing hydrogen chloride was mixed with fresh butadiene and the mixture was preheated to about 215°–220° C. The preheated hydrocarbon was mixed with chlorine at a T-piece and the mixture was passed into a tubular reactor the capacity of which was 7 parts by volume. The reactor products were passed into a fractionating column at the head of which butadiene and hydrogen chloride were removed and recycled, and at the base of which butadiene chlorination products were removed. Part of the recycle stream was removed so that the hydrogen chloride content of the recycle stream remained constant at about 12–14% by volume.

With the fresh butadiene feed-rate at 2250 parts by volume per hour, chlorine 2150 parts by volume per hour, and butadiene plus hydrogen chloride recycle rate of 9600 parts by volume per hour were fed at a preheater temperature of 215–220° C. gave a maximum reactor temperature of 345–355° C. The time of contact was 1.4 seconds. 100–120 parts by volume per hour of the recycle stream were removed. This contained 12–14 parts by volume of hydrogen chloride which was washed out with water and the residual butadiene was dried and stored for re-use in the process.

The product consisted of dichlorbutenes, 90.1% by weight, low boilers, 3.8% by weight and high boilers 6.1% by weight.

Example 4

The reactor used was that described in Example 1.

Butadiene at the rate of 208,000 parts by volume per hour, hydrogen chloride at the rate of 100,000 parts by volume per hour, and chlorine at the rate of 64,500 parts by volume per hour were fed at a preheater temperature of 285° to give a reactor temperature of 320–330° C., these volumes being calculated at normal temperatures and pressures. The hydrogen chloride concentration was about 27%. The time of contact was 0.38 second.

The product consisted of

| | Percent by weight |
|---|---|
| Dichlorbutenes | 85 |
| Chloroprene | } 5.8 |
| 1-chlorbutadiene | } |
| High boilers | 9.2 |

By way of comparison the process of Example 4 was repeated replacing the hydrogen chloride with an equal volume of nitrogen. The results were as follows:

| | Percent by weight |
|---|---|
| Dichlorbutenes | 81.6 |
| Chloroprene | } 3.4 |
| 1-chlorbutadiene | } |
| High boilers | 15 |

Example 5

Recycle butadiene containing hydrogen chloride was mixed with fresh butadiene and the mixture was preheated to about 155–160° C. The preheated hydrocarbon was mixed with chlorine at a T-piece and the mixture was passed into a tubular reactor of a capacity of 36 parts by volume. The reactor products were passed into a fractionating column at the head of which butadiene and hydrogen chloride were removed and recycle, and at the base of which butadiene chlorination products were removed. Part of the recycle stream was removed so that the hydrogen chloride content of the recycle stream remained constant about 35% by volume.

With the fresh butadiene feed rate at 2,500 parts by volume per hour, chlorine, 2,250 parts by volume per hour, and butadiene plus hydrogen chloride recycle rate of 9,600 parts by volume per hour a preheater temperature of 155–160° C. gave a maximum reactor temperature of 330–340° C. The contact time was 9.5 seconds. 350 parts by volume per hour of the recycle stream containing 35% by volume of hydrogen chloride were removed, the hydrogen chloride was washed out with water, and the residual butadiene was dried and stored for re-use in the process.

The product consisted of dichlorbutenes, 92.8% by weight, low boilers, 3.0% by weight, and high boilers, 4.2% by weight.

The invention is further illustrated with reference to the accompanying drawing, which is a flow diagram of one embodiment of the present invention.

Recycle butadiene containing hydrogen chloride in line 1 is mixed with fresh butadiene in line 2 and the mixture is preheated in preheater 3. The preheated hydrocarbon is mixed with chlorine at the T-piece 4 and the mixture passed into the tubular reactor 5, the reactor products are passed into fractionating column 6 at the head of which butadiene and hydrogen chloride are removed and recycled by line 1. Part of the recycle stream is removed by line 7 and passed to scrubber 8 where hydrogen chloride is washed out equivalent to that formed in the reaction. The scrubbed butadiene is recycled to the preheater 3, by line 9.

When the process is being started up the butadiene and hydrogen chloride from the top of column 6 are completely recycled, and the scrubber 8 is not operated until the hydrogen chloride in the system has built up to the desired level.

We claim:

1. The process for the production of dichlorbutenes by the additive chlorination of butadiene in the vapor phase which comprises contacting chlorine with butadiene in the ratio of at least one mole of butadiene per mole of chlorine at an elevated temperature in the presence of hydrogen chloride fed with the butadiene to produce a product having major amounts of 3:4-dichlorbutene-1 and 1:4-dichlorbutene-2.

2. The process as claimed in claim 1 wherein the concentration of hydrogen chloride in the reaction mixture is at least 5% by volume.

3. The process as claimed in claim 1 wherein the concentration of hydrogen chloride in the reaction mixture is between 30 and 50% by volume.

4. The process as claimed in claim 1 wherein the reaction temperature is between 280° and 400° C.

5. The process as claimed in claim 1 wherein the reaction is carried out continuously.

6. The process as claimed in claim 5 wherein the hydrogen chloride is fed to the reaction in admixture with the butadiene feed.

7. The process as claimed in claim 5 wherein the reaction product is fractionated to recover a fraction containing butadiene and hydrogen chloride, and this fraction is recycled to the reaction.

8. The process as claimed in claim 7 wherein part of the recycle butadiene stream is treated for the recovery of the hydrogen chloride therefrom.

9. The process as claimed in claim 5 wherein the contact time is between 0.1 and 12 seconds.

10. A process which comprises continuously supplying a reaction mixture of chlorine, butadiene and hydrogen chloride and reacting same at a temperature of between 280° and 400° C. in an unpacked reactor to form a mixture containing 3:4-dichlorbutene-1 and 1:4 dichlorbutene-2 hydrogen chloride and unreacted butadiene, separating the dichlorbutenes and recycling unreacted butadiene and hydrogen chloride to the reaction mixture for further reaction under said temperature and other reaction conditions.

11. A process which comprises continuously supplying a reaction mixture of chlorine, butadiene and hydrogen chloride and reacting same at a temperature of 280° to 400° C. in an unpacked reactor to form a mixture containing 3:4-dichlorbutene-1 and 1:4 dichlorbutene-2, hydrogen chloride and unreacted butadiene, separating the dichlorbutenes and recycling unreacted butadiene and hydrogen chloride to the reaction mixture for further reaction under said temperature and other reaction conditions, and maintaining the hydrogen chloride content between about 30 and 50% by volume.

12. A process which comprises continuously preheating a mixture of butadiene and hydrogen chloride to between 150° and 300° C. and reacting same with chlorine at a temperature of between 280° and 400° C. in an unpacked reactor to form a mixture containing 3:4 dichlorbutene-1 and 1:4 dichlorbutene-2, hydrogen chloride and unreacted butadiene, separating the dichlorbutenes and recycling unreacted butadiene and hydrogen chloride to the reaction mixture for further reaction under said temperature and other reaction conditions.

References Cited in the file of this patent

UNITED STATES PATENTS

| | | |
|---|---|---|
| 2,299,477 | Hearne et al. | Oct. 20, 1942 |
| 2,442,324 | Heitz et al. | May 25, 1948 |
| 2,573,695 | Dolnick et al. | Nov. 6, 1951 |
| 2,727,076 | Warren | Dec. 13, 1955 |

FOREIGN PATENTS

| | | |
|---|---|---|
| 661,806 | Great Britain | Nov. 28, 1951 |

OTHER REFERENCES

Prutton et al.: Fundamental Principles of Physical Chemistry, Revised edition (1951), The Macmillan Co., page 336.

Daniels: Outlines of Physical Chemistry (1948), page 355, John Wiley & Sons, Inc.